US007692684B2

(12) United States Patent
Ku et al.

(10) Patent No.: US 7,692,684 B2
(45) Date of Patent: Apr. 6, 2010

(54) PEOPLE COUNTING SYSTEMS AND METHODS

(75) Inventors: Shyan Ku, Vancouver (CA); Malcolm Steenburgh, Vancouver (CA); Vladimir Tucakov, Vancouver (CA)

(73) Assignee: Point Grey Research Inc., Vancouver (CA)

( * ) Notice: Subject to any disclaimer, the term of this patent is extended or adjusted under 35 U.S.C. 154(b) by 1327 days.

(21) Appl. No.: 10/949,295

(22) Filed: Sep. 27, 2004

(65) Prior Publication Data

US 2006/0067456 A1 Mar. 30, 2006

(51) Int. Cl.
*H04N 5/225* (2006.01)
*G06K 9/46* (2006.01)

(52) U.S. Cl. ....................................... 348/169; 382/192

(58) Field of Classification Search ................. 348/143, 348/150, 169; 235/385; 715/764; 382/192; 370/253

See application file for complete search history.

(56) References Cited

U.S. PATENT DOCUMENTS 4,303,851 A 12/1981 Mottier
5,097,328 A * 3/1992 Boyette ...................... 348/150
5,465,115 A 11/1995 Conrad et al.
5,764,283 A * 6/1998 Pingali et al. .............. 348/169
5,973,732 A 10/1999 Guthrie
6,674,726 B1 * 1/2004 Kado et al. ................. 370/253
6,697,104 B1 * 2/2004 Yakobi et al. ............... 348/143
6,712,269 B1 * 3/2004 Watkins ...................... 235/385
6,987,885 B2 * 1/2006 Gonzalez-Banos et al. .. 382/192
2006/0036960 A1 * 2/2006 Loui .......................... 715/764

FOREIGN PATENT DOCUMENTS

EP 0 823 821 A2 2/1998
EP 0 847 030 A2 6/1998
WO WO 02/097713 A2 12/2002

* cited by examiner

*Primary Examiner*—Gims S Philippe
(74) *Attorney, Agent, or Firm*—Oyen Wiggs Green & Mutala LLP

(57) ABSTRACT

A system for counting a number of people or other moving objects entering or leaving a space has a camera which provides an image of an entrance to the space. A data processor identifies moving objects in the image. The data processor is configured to count people or other objects which enter or leave an area within the image for two or more segments of a boundary of the area. Accuracy of the counting system can be monitored by comparing the counts for the different segments.

26 Claims, 8 Drawing Sheets

PEOPLE COUNTING SYSTEMS AND METHODS

TECHNICAL FIELD

The invention relates to automated systems for counting people or other moving objects.

BACKGROUND

People counting is becoming an important tool. People counting systems have applications in security, entertainment, retail, and other fields. Various video-based people counting systems are commercially available. Such systems have the advantage that they can determine the directions in which people are moving.

A video-based people counting system could be placed, for example, in the entrance of a retail establishment and used to detect patterns in when patrons enter and leave the retail establishment.

Historically, automated people counting systems have had the problem that there is no way to determine their accuracies in a consistent and ongoing basis. This critical flaw leads to a lack of confidence in the numbers that are produced.

Attempts have been made to come up with mechanisms for determining system accuracy in the past. These mechanisms fall into two basic categories: 1) Using humans to verify counts, either by counting live or by recording a video and counting at a later time. It has been shown that even humans well trained in the art of counting fatigue too quickly to produce accurate numbers. Additionally, the cost of verifying the performance of an automatic people counting system using human counters makes it impractical to take into account changes in environmental and traffic patterns over longer periods of time. Finally, it is very difficult to correlate the data generated by an automatic counting system with data generated by human counters, thus making it even more difficult to determine when the errors actually occurred. 2) Another possibility is to use additional automated counting systems. These types of solutions have the advantage that they are consistent and do not tire as humans do but they tend to be expensive, require additional infrastructure and introduce issues related to their own counting failures. Again, these systems have to be permanently installed in order to monitor changes in accuracy resulting from alterations to environmental parameters and traffic patterns. Finally, integrating counting data and registering failures is still a difficult if not impossible problem.

Some examples of video based people counting systems are Yakobi et al. U.S. Pat. No. 6,697,104; Guthrie U.S. Pat. No. 5,973,732; Conrad et al. U.S. Pat. No. 5,465,115; Mottier U.S. Pat. No. 4,303,851; Vin, WO 02/097713; Ming et al. EP 0 823 821 A2; and Boninsegna EP 0 847 030 A2.

There is a need for reliable and cost effective methods and systems for verifying the accuracy of systems for counting people or other movable objects.

SUMMARY OF THE INVENTION

This invention provides methods and apparatus for counting people, cars, or other moving objects. The methods involve obtaining digitized images of an area and identifying cases when the moving objects cross a closed boundary of a defined area within the image.

One aspect of the invention provides an automated method for counting objects moving between spaces. The method comprises: obtaining digitized images of a region lying between two or more spaces and, in a data processor: processing the digitized images to detect moving objects in the images; for a period, accumulating a first count of those of the moving objects that cross a boundary of a defined area lying within the image in a direction into the defined area; for the period accumulating a second count of those of the moving objects that cross the boundary of the defined area in a direction out of the defined area; and, computing an accuracy measure based at least in part on the first and second counts. The region may overlap with one or more of the spaces.

Another aspect of the invention provides a computer program product comprising a computer readable medium carrying computer readable instructions which, when executed by a data processor, cause the data processor to perform a method according to the invention.

A further aspect of the invention provides apparatus for counting people or other moving objects. The apparatus comprises a data processor connected to receive digitized images of a region lying between two or more spaces. The data processor executes software instructions that cause the data processor to detect moving objects in the images. The apparatus comprises a data store accessible to the data processor. The data store stores: an area definition, the area definition defining a boundary of a defined area within the images, the boundary comprising a plurality of segments; and, for each of the plurality of segments, an inbound moving object counter and an outbound moving object counter. The data processor is configured to: each time a moving object crosses into the defined area across one of the segments, increment the corresponding one of the inbound moving object counters; each time a moving object crosses out of the defined area across one of the segments, increment the corresponding one of the outbound moving object counters; and, compute an accuracy measure based at least in part on a sum of the counts in the inbound moving object counters and a sum of the counts in the outbound moving object counters. The accuracy measure could comprise a difference between these sums, a quotient of these sums, or a more complicated function of these sums.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention is described herein with reference to counting people. The invention may also be applied to counting cars or other moving objects.

This invention provides image-based counting systems and methods which define an area surrounded by a boundary within an image. The systems detect people in the image and determine when, and in what direction, the people cross the boundary. Since it can be assumed that people are not created within the area, the number of people counted as entering the area minus the number of people counted exiting the area should equal the number of people in the area (if there were initially no people in the area). Any deviation from this equality indicates counting errors.

A system according to the invention may periodically compute an accuracy rate. For example, at times when the area is empty of people the system may compute the result of the function:

$$ER = \left|\frac{A - B}{A + B}\right| \quad (1)$$

or a mathematical equivalent thereof, where ER is a measure of error rate; A is a sum of counted entrances into the area over a period beginning at a time that the area was empty of people; and B is a sum of counted exits from the area over the same period. The function of Equation (1) can be generalized to cases in which there are people within the area at the start and/or end of the period as follows:

$$ER = \left|\frac{A - B - \Delta C}{A + B}\right| \quad (2)$$

or a mathematical equivalent thereof, where ΔC is a net change in the number of people within the area over the period. Other measures of error rate may also be used. An example of an alternative measure of error rate is:

$$ER = \frac{|A - B|}{\max(A, B)} \quad (3)$$

where A and B are defined above.

Figure 1:
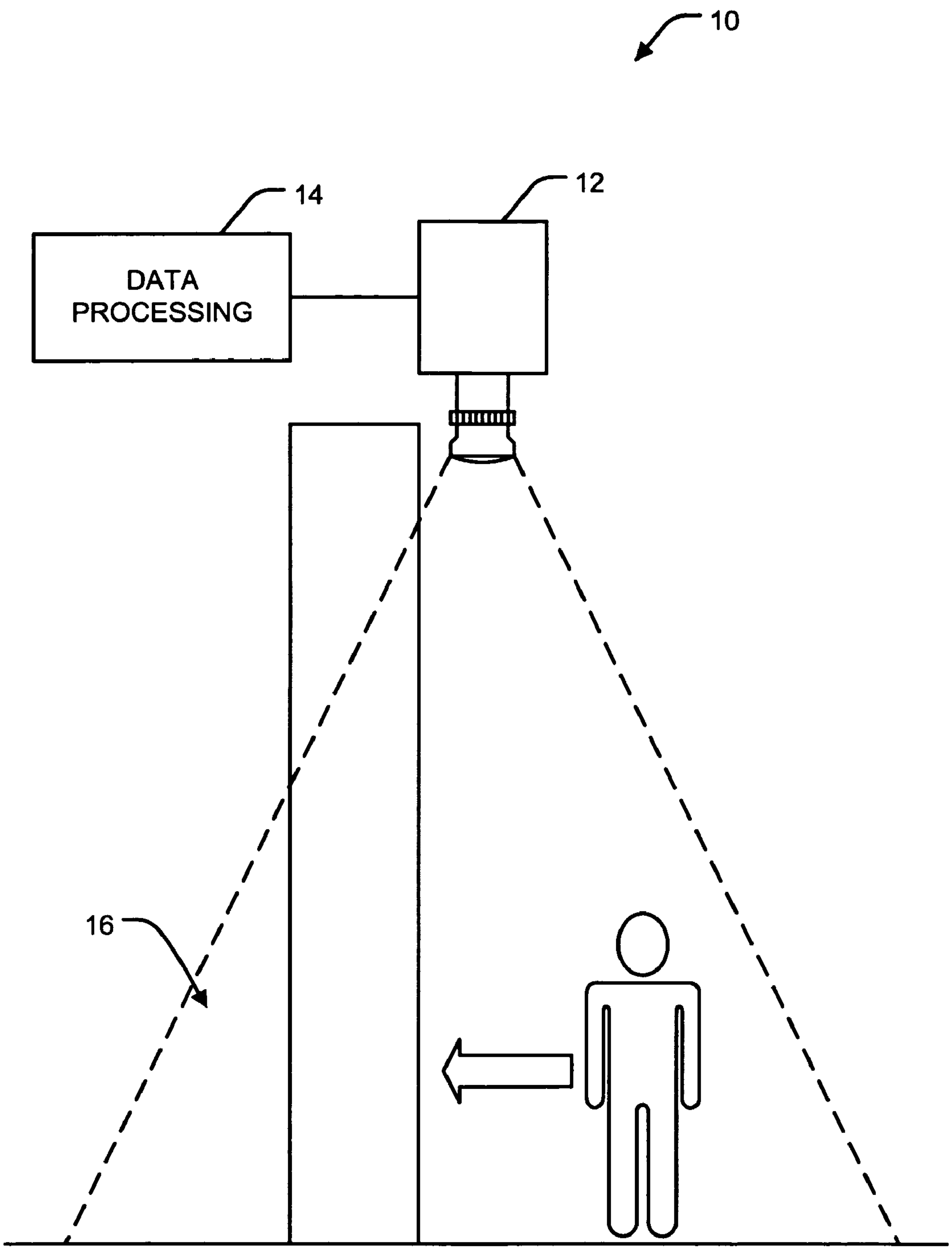
FIG. 1 is a block diagram of a system according to the invention.

FIG. 1 is a schematic view of a system 10 according to the invention. System 10 has a camera 12 which generates image data. The image data is provided to a data processor 14. Camera 12 images from above an area 16 which may be, for example, at an entrance to a shop. Area 16 is bounded by a polygon or other closed shape.

Data processor 14 includes software which identifies people or other moving objects in the images from camera 12. Data processor 14 may comprise an embedded system, a stand-alone computer, or any other suitable data processor which receives image data from camera 12. The details of operation of data processor 14 are not described herein as methods for identifying moving objects in images are well known to those skilled in the field of computer image processing and various systems capable of detecting moving objects in sequences of digitized images are commercially available.

Figure 2:
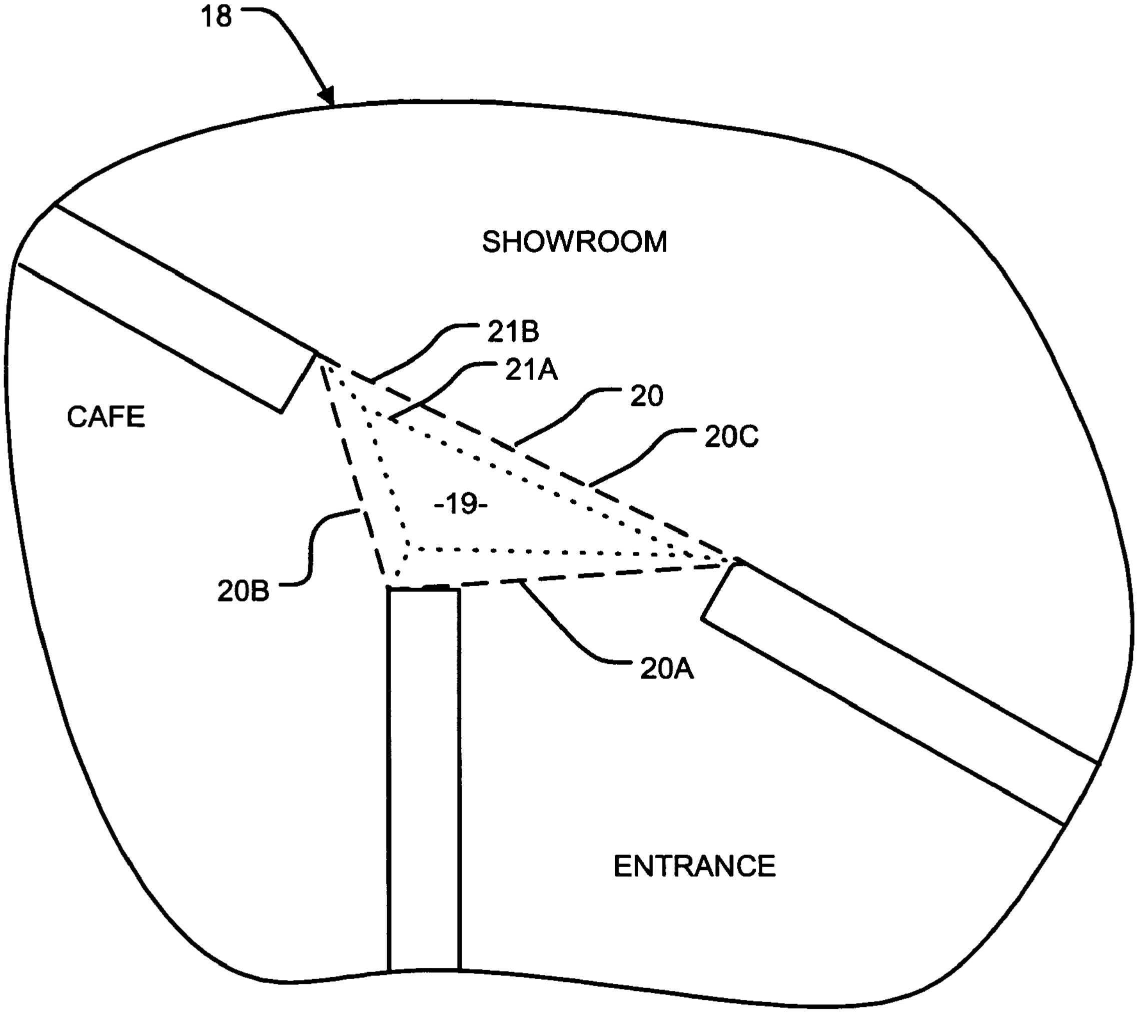
FIG. 2 is a schematic view of a portion of an image being processed by a system according to the invention.

FIG. 2 shows schematically a portion of an image 18 captured by camera 12 in an example application. In this example, image 18 includes the intersection of three spaces, an entrance, a cafe, and a showroom. Data processor 14 is configured to count people which move into, and out of, an area 19 surrounded by a closed boundary 20. In the illustrated embodiment, boundary 20 is a polygon (in this case, a triangle). Boundary 20 has sides 20A, 20B, and 20C.

In some embodiments of the invention, boundary 20 is defined in three-dimensional space as lying on the floor, camera 12 comprises a stereoscopic camera system or another type of camera system that provides image data from which the locations of objects in the field of view of camera 12 can be determined in three dimensions and data processor 14 is configured to to derive three-dimensional information from the image data in order to accurately determine the locations of people's feet (or other body parts near to the floor) in three dimensional space. This avoids the problem that it is difficult to accurately determine from image coordinates alone the location of a person of unknown height in a two-dimensional image. The Censys3D™ camera system marketed by Point Grey Research of Vancouver, Canada may be used for camera 12, for example.

Data processor 14 is configured to count and separately keep track of the number of people detected entering area 19 and the number of people leaving area 19 by way of each of sides 20A, 20B and 20C. This information can be used to determine the accuracy of system 10 by way, for example, of Equation (1). The total number of people entering area 19 can be determined by summing the number of people entering area 19 by way of each of sides 20A, 20B, and 20C. The total number of people who have left area 19 can be determined by summing the number of people leaving area 19 by way of each of sides 20A, 20B, and 20C.

Data processor 14 may use any suitable method to identify cases wherein a person has crossed boundary 20. For example, boundary 20 may comprise an inner threshold line 21A and an outer threshold line 21B. A person may be counted as having crossed boundary 20 when the person has crossed both inner and outer threshold lines 21A and 21B.

Figure 1A:
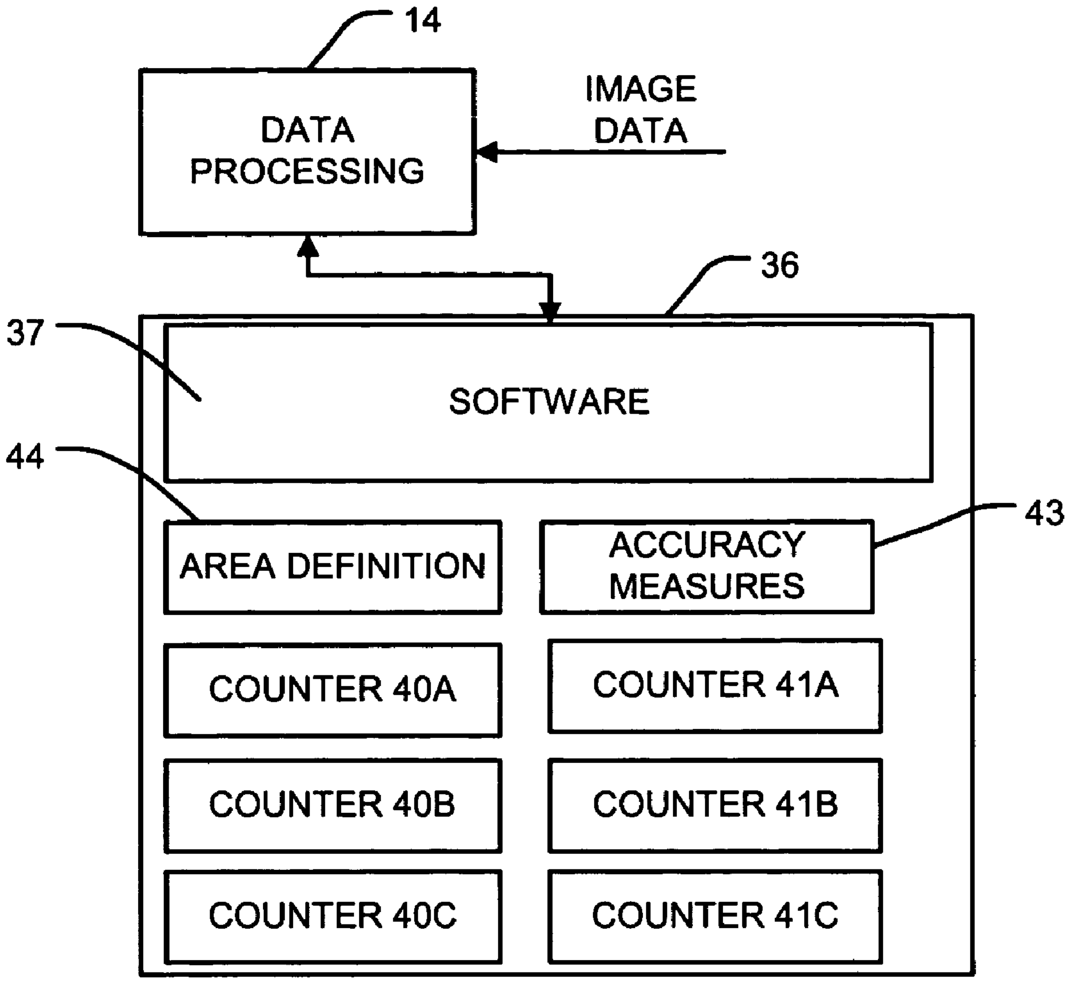
FIG. 1A is a block diagram showing some computer accessible information used in the system of FIG. 1.

As shown in FIG. 1A, data processor 14 has access to a program and data store 36 containing software 37. Under the control of software 37, data processor 14 maintains an incoming counter (which may also be called an "inbound moving object counter") and an outgoing counter (which may also be called an "outbound moving object counter") corresponding to each of a plurality of segments which make up boundary 20. In the illustrated embodiment incoming counters 40A, 40B and 40C (collectively incoming counters 40) correspond to sides 20A, 20B, and 20C respectively and outgoing counters 41A, 41B and 41C (collectively outgoing counters 41) correspond to sides 20A, 20B, and 20C respectively.

Data store 36 also comprises a stored definition 44 which defines boundary 20. Definition 44 may be provided in any suitable form including:

- a set of points which specify vertices of boundary 20;
- a set of functions which specify segments of boundary 20;
- a subroutine which, given a point, indicates whether or not the point is within area 19 or on boundary 20;
- a lookup table which, given a point indicates whether or not the point is within area 19 or on boundary 20;
- and so on.

Software 37 detects people moving in image data from camera 12. This may be done in any suitable manner. For example, various suitable ways to identify and track moving objects in digital images are known to those skilled in the art, described in the technical and patent literature, and/or implemented in commercially available software.

Software 37 identifies instances when a person crosses boundary 20. Each time this occurs, software 37 determines the direction in which the person crosses the boundary (i.e. whether the person is entering area 19 or leaving area 19) and increments the appropriate one of counters 40 and 41.

The information in counters 40 and 41 about how many people have entered or left area 19 by way of each of the sides of boundary 20 can also be used to obtain other valuable information. Consider the following example, for instance: in a given period: 55 people are counted going into area 19 and 53 people are counted leaving area 19 by way of side 20A; 45 people are counted going into area 19 and 48 people are counted leaving area 19 by way of side 20B; and, 8 people are counted going into area 19 and 7 people are counted leaving area 19 by way of side 20C. One can use these counts to draw a number of conclusions about the period including:

55 people have entered the store and 53 have left;

48 people who entered went to the café, 7 went to the showroom, 2 have not left the premises; and, there are currently 2 people in the café.

Periodically, at selected times, or continuously, software 37 causes data processor 14 to perform an accuracy check. The accuracy check may operate by summing the values in counters 40 and summing the values in counters 41. Any errors that miss or overcount people on one segment of boundary 20 of area 19 but not on another will show up as additional/fewer entrances/exits on that segment. If there are no people in area 19 when the accuracy check is performed and there were no people in area 19 when counters 40 and 41 were initialized then any difference between the sum of counters 40 and the sum of counters 41 indicates that counting errors must have occurred.

If there were some people in area 19 when counters 40 and 41 were initialized then the number of people initially in area 19 can be taken into account, for example by using Equation (2).

In the above example, it can be seen that system accuracy can be given by:

$$SA = 100 \times \left(1 - \left|\frac{\sum \text{counters } 40 - \sum \text{counters } 41}{\sum \text{counters } 40 + \sum \text{counters } 41}\right|\right) \tag{4}$$

and mathematical equivalents thereof.

In some embodiments of the invention, software 37 waits until it determines that there are no people in area 19 to trigger an accuracy check. In other embodiments, when software 37 triggers an accuracy check, software 37 counts and takes into account people found within area 19 when performing the accuracy check, as described above.

In the illustrated embodiment, each of sides 20A, 20B, and 20C, is located so that in moving among the three spaces (entrance, cafe, and showroom) people must cross two of the sides. Area 19 is located at the intersection of the three spaces. This is not necessary, however. FIGS. 3A through 3D show some example arrangements of areas in different embodiments of the invention.

Figure 3A:
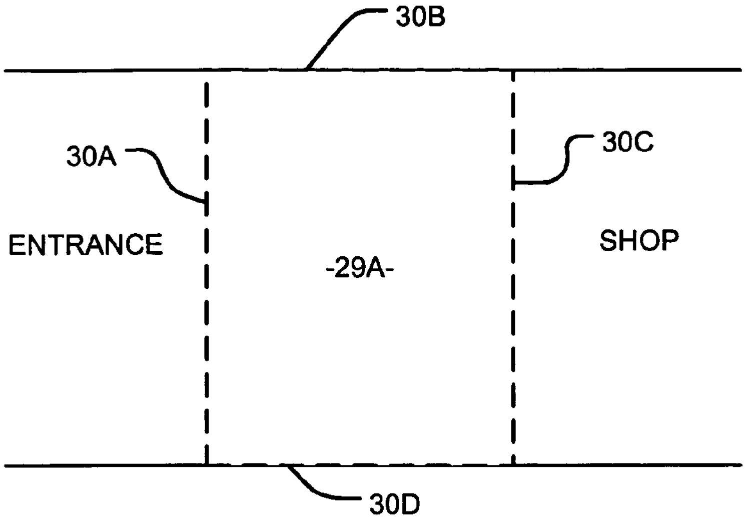
FIGS. 3A through 3E show various alternative implementations of the invention.

FIG. 3A shows an embodiment wherein data processor 14 is configured to count people entering or leaving an area 29A having a boundary 30. In this example, people cannot enter or leave through sides 30B or 30D because these sides correspond to walls.

Figure 3B:
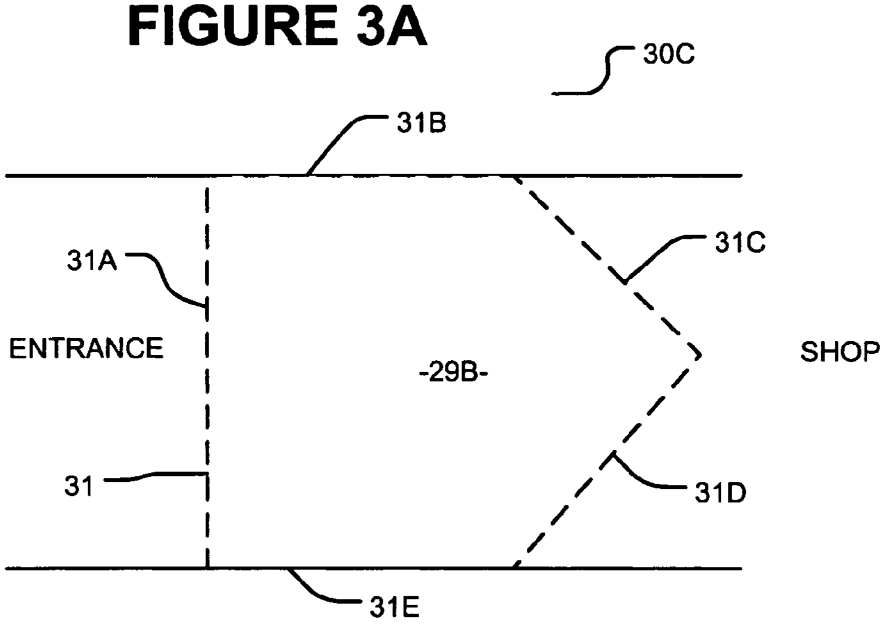

FIG. 3B shows another alternative which is the same as that of FIG. 3A except that area 29B has a boundary 31 with sides 31A through 31E which define a pentagon shape. In this embodiment, two segments of the boundary (31C and 31D) both correspond to movement into or out of one space (the shop).

Figure 3C:
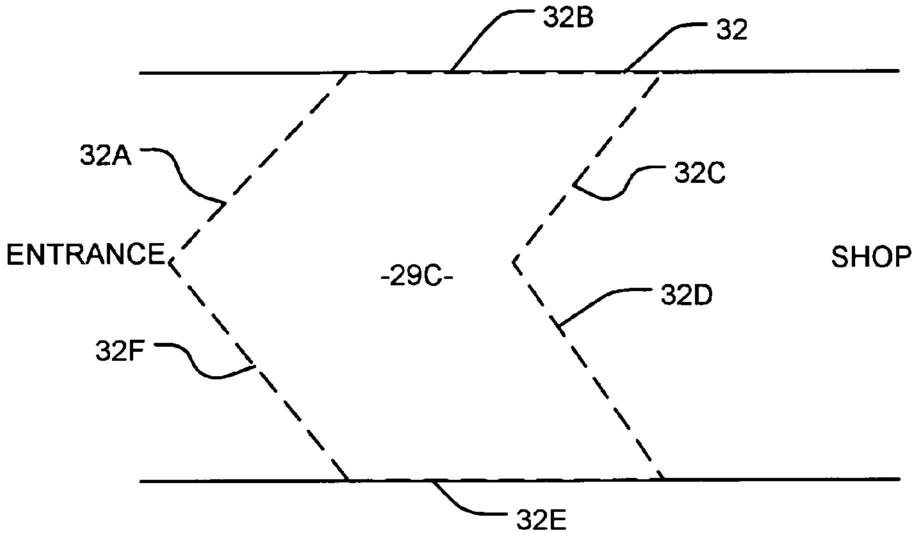

FIG. 3C shows another alternative which is the same as that of FIG. 3A except that area 29C has a boundary 32 with sides 32A through 32F which define a six-sided polygon shape. In this embodiment, a person can move between area 29C and the shop by way of either of two segments of the boundary (32C and 32D). A person can move between the entrance and area 29C by way of either of two segments of the boundary (32A and 32F).

Figure 3D:
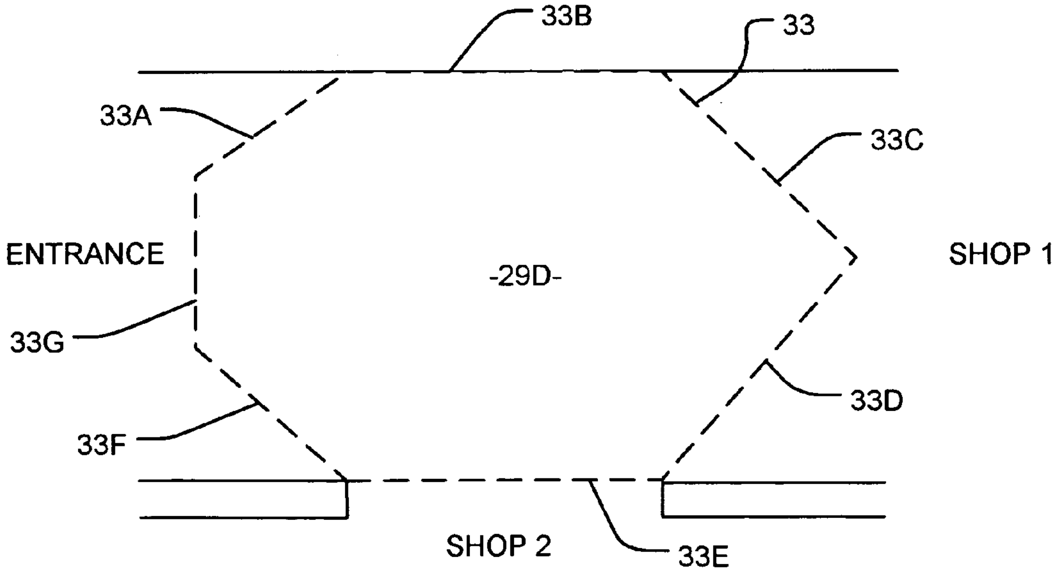

FIG. 3D shows another alternative embodiment in which an area 29D has a boundary 33 with sides 33A through 33G which define a seven-sided polygon shape. In this embodiment, a person can move between area 29D and the entrance by way of any of segments 33A, 33F and 33G of boundary 33. A person can move between a first shop (shop 1) and area 29D by way of either of two segments of the boundary (33C and 33D). A person can move between area 29D and a second shop (shop 2) by way of segment 33E.

Figure 3E:
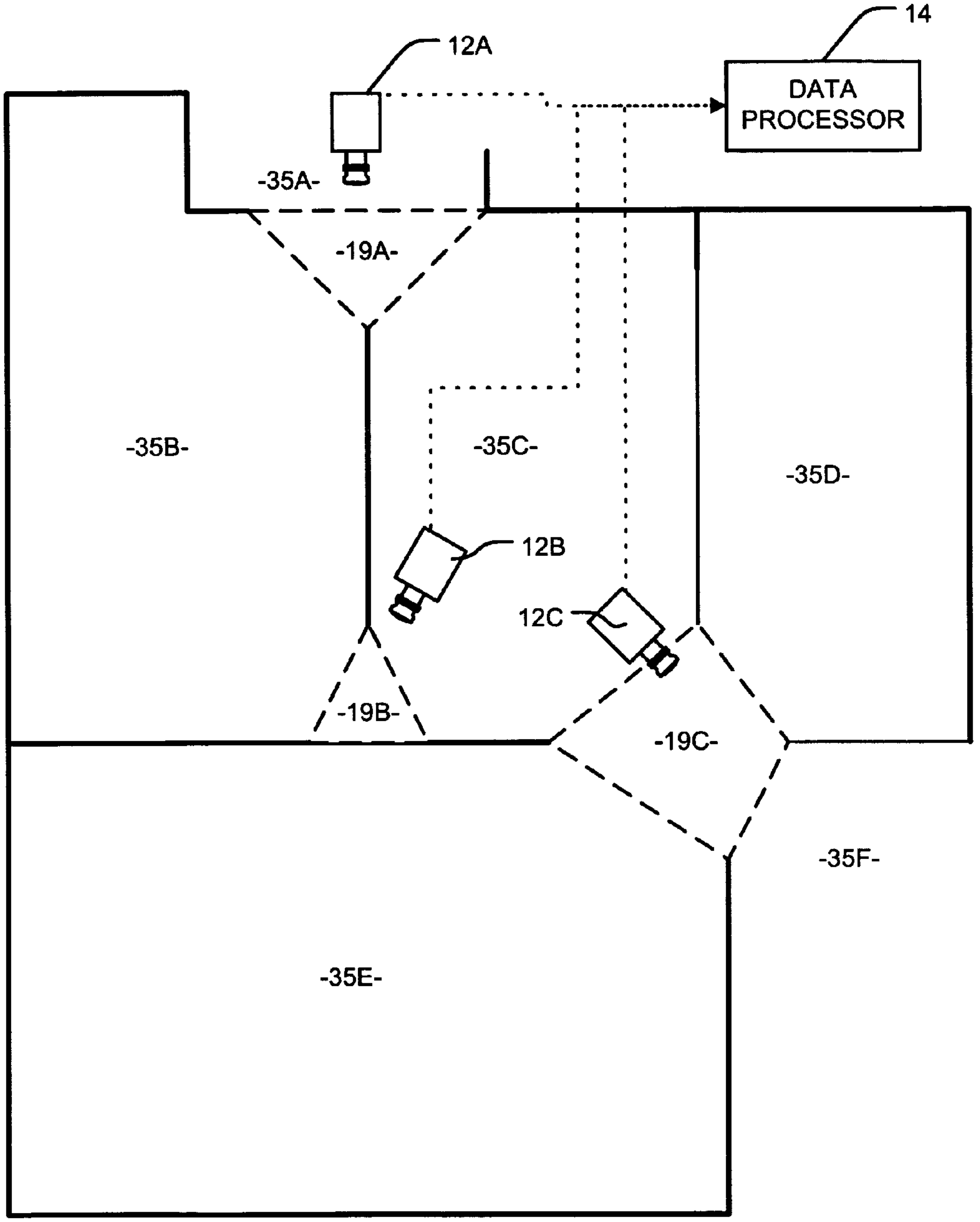

In some embodiments of the invention system 10 monitors multiple areas 19. Each area 19 lies between two or more spaces. Such systems may be used to derive information about the movements of people between spaces which have more complicated topologies than the simple examples shown in FIGS. 3A to 3D. FIG. 3E shows a simple example of a system according to the invention having first camera 12A, second camera 12B and third camera 12C which respectively obtain image data covering first, second and third areas 19A, 19B and 19C.

The system of FIG. 3E obtains data relating to the movements of people between spaces 35A through 35F. Errors are monitored separately for each of areas 19A through 19C.

Figure 4:
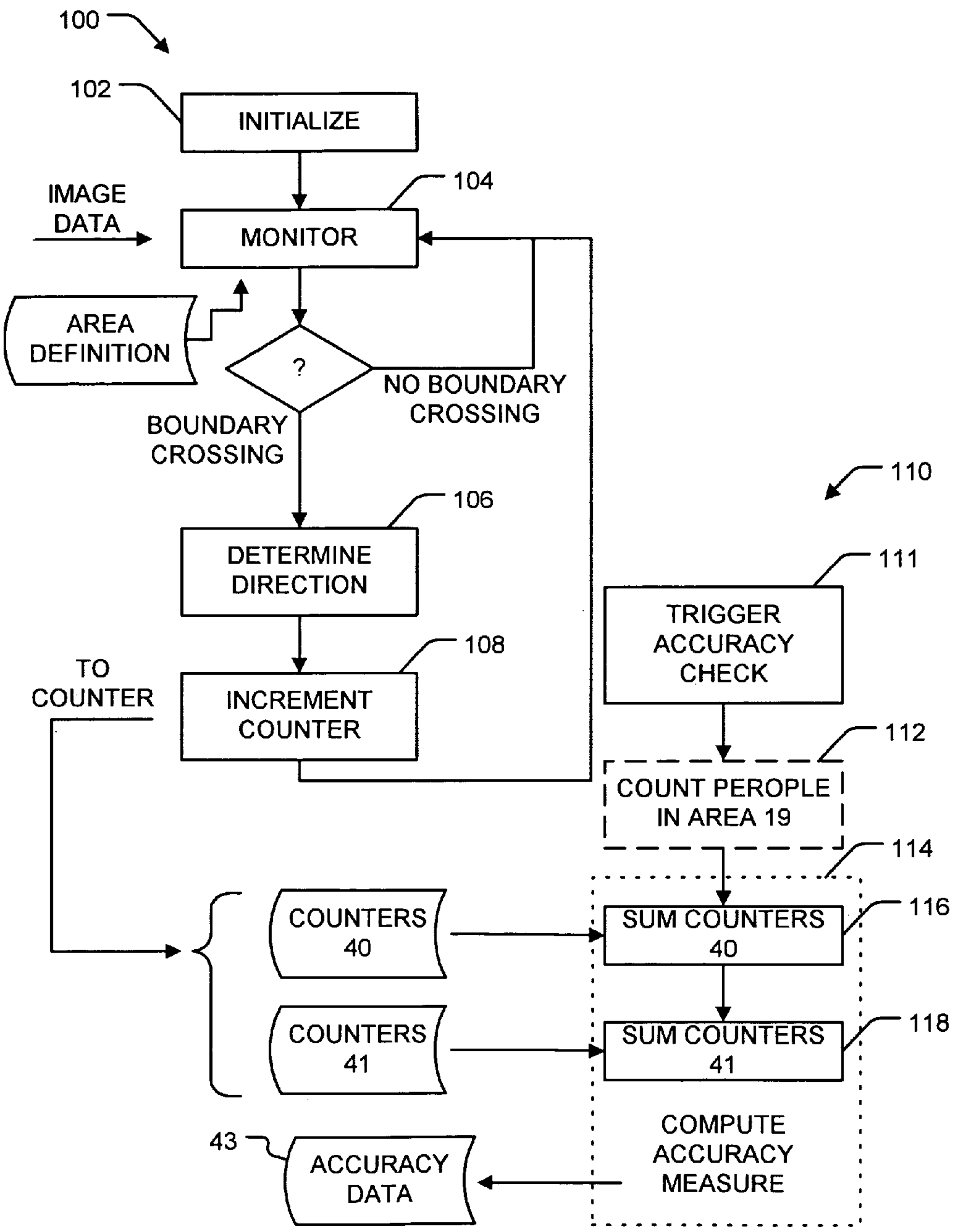
FIG. 4 is a flow chart which illustrates a method according to the invention; and, FIGS. 5A and 5B are bar charts showing an accuracy measure as a function of time for an example embodiment of the invention.

FIG. 4 is a flowchart illustrating a method 100 according to the invention for counting people passing through the area shown in the image of FIG. 2. Method 100 begins at block 102 by initializing counters 40 and 41 for each of the segments of boundary 20.

In block 104 method 100 monitors image data from camera 12 and detects moving persons in the video data. Method 100 waits in block 104 until it detects that a person has crossed boundary 20 either into or out of area 19. In block 106, method 100 determines whether the person crossed into or out of area 19. In block 108 the one of counters 40 and 41 corresponding to the person's direction and the segment of boundary 20 crossed by the person is incremented. Method 100 repeats blocks 106 and 108 each time a person passes into or out of area 19 across boundary 20.

Method 100 may periodically store a record of the contents of counters 40 and 41 to permit the later study of traffic patterns as a function of time. In some embodiments of the invention, the processor buffers image data from camera 12. For example, the system may maintain an image buffer containing the most recent minute or ½ minute of image data from camera 12. When the system detects a counting error, the system automatically preserves the contents of the image buffer. This permits study after the fact of the circumstances leading to counting errors.

Periodically, occasionally, or continuously, method 100 invokes an accuracy checking procedure 110. Accuracy checking procedure is initiated at block 111. Block 111 may initiate an accuracy check based upon any suitable criteria. In some embodiments of the invention, block 111 triggers an accuracy check based upon one or more of the following trigger events:

- a timer indicates that it is time for an accuracy check;
- there are no persons in area 19;
- a user has indicated that an accuracy check should be done;
- method 100 has detected at least a certain number of events in which a person has crossed boundary 20; and so on.

Accuracy checking may be performed in real time or may be performed after the fact based upon stored contents of counters 40 and 41.

Unless procedure 110 has been triggered to perform an accuracy computation as of a time when there are no persons in area 19, block 112 counts the people in area 19. Block 114 computes and stores an accuracy measure 43. Block 114 may comprise summing the contents of counters 40, as indicated by block 116, and summing the contents of counters 41, as indicated by block 118.

Figure 5A:
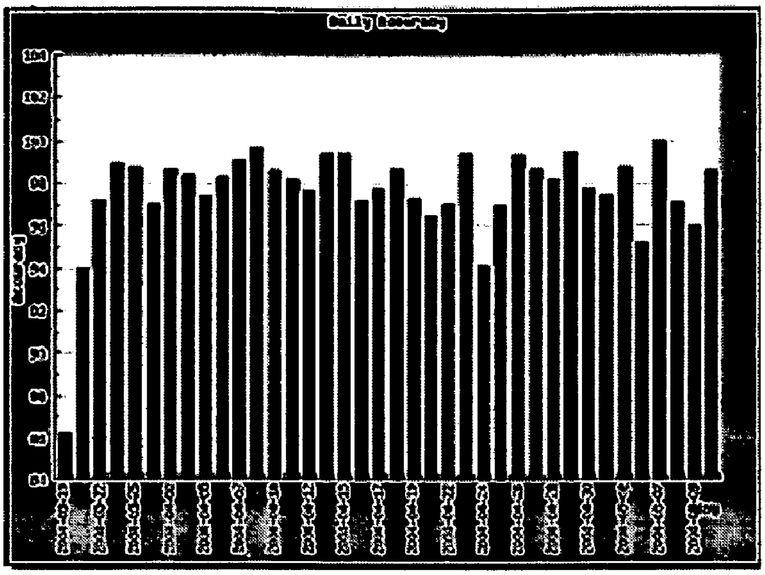
Figure 5B:
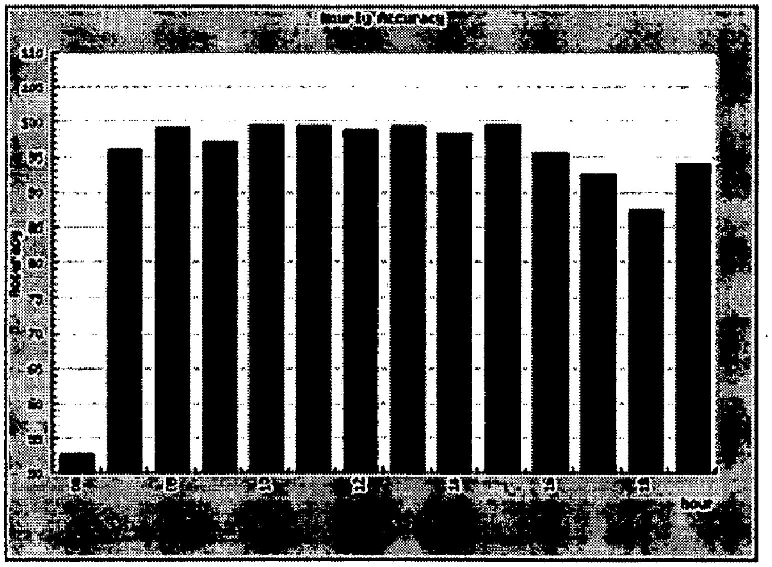

FIGS. 5A and 5B are bar charts showing an accuracy measure as a function of time for an example embodiment of the invention. FIG. 5A shows the accuracy measure computed for whole days. The accuracy measure may be computed over longer or shorter periods of time. FIG. 5B shows the accuracy measure computed on an hourly basis.

It can be seen that the embodiments of the invention described herein have the advantages that:

- accuracy checking is completely automated;
- the systems are consistent in the manner by which they count people multiple times;
- the systems do not require any additional hardware and very little additional processing in comparison to existing video-based people counting systems;
- data is automatically correlated;
- the systems have a granularity which is only as coarse as the rate at which samples are taken; and,
- the systems allow for errors to be identified immediately.

Certain implementations of the invention comprise computer processors which execute software instructions which cause the processors to perform a method of the invention. For example, one or more data processors may implement the methods described herein by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, EPROMS, flash RAM, or the like. The software instructions may be encrypted or compressed on the medium.

Where a component (e.g. software, a processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

- Camera 12 is not necessarily a camera which takes pictures at visible wavelengths. Camera 12 could operate at infrared or other wavelengths.
- Camera 12 is not necessarily a single camera. A system may include multiple cameras which obtain images of an area 19. By combining data from multiple cameras a system may be less susceptible to occlusions or other line-of-sight issues that can cause counting errors. Camera 12 may comprise one or more stereo vision camera systems.
- A system according to the invention may be implemented using any type of sensor that provides at least a two dimensional indication of the locations of moving objects being counted.
- The segments are not necessarily straight lines. An area could be defined by a boundary which includes one or more curved segments.
- The system described above uses a single camera 12. As known to those skilled in the art, multiple cameras 12 may be used to enlarge the area which is imaged.
- While it is convenient to implement the processes described herein by way of computer software instructions, the processes could also be implemented in suitably designed hardware in ways that will be readily apparent to those skilled in the art.
- Some embodiments of the invention may not keep separate counters for segments of the boundary of area 19 that would be impossible for a moving object to cross (e.g. the segment lies along a solid wall).

Accordingly, the scope of the invention is to be construed in accordance with the substance defined by the following claims.

We claim:

1. An automated method for counting objects moving between spaces, the method comprising:

- obtaining digitized images of a region lying between two or more spaces;
- in a data processor:
- processing the digitized images to detect moving objects in the images;
- for a period, accumulating a first count of those of the moving objects that cross a boundary of a defined area lying within the image in a direction into the defined area;
- for the period, accumulating a second count of those of the moving objects that cross the boundary of the defined area in a direction out of the defined area; and,
- computing an accuracy measure based at least in part on the first and second counts the accuracy measure indicative of a rate of errors in the first or second counts.

2. A method according to claim 1 wherein computing the accuracy measure comprises computing a difference of the first and second counts.

3. An automated method for counting objects moving between spaces, the method comprising:

- obtaining digitized images of a region lying between two or more spaces;
- in a data processor:
- processing the digitized images to detect moving objects in the images;

for a period, accumulating a first count of those of the moving objects that cross a boundary of a defined area lying within the image in a direction into the defined area;

for the period, accumulating a second count of those of the moving objects that cross the boundary of the defined area in a direction out of the defined area; and, computing an accuracy measure based at least in part on the first and second counts, wherein computing the accuracy measure comprises computing a difference of the first and second counts and dividing the difference of the first and second counts by a sum of the first and second counts.

4. An automated method for counting objects moving between spaces, the method comprising:

obtaining digitized images of a region lying between two or more spaces;

in a data processor:

processing the digitized images to detect moving objects in the images;

for a period, accumulating a first count of those of the moving objects that cross a boundary of a defined area lying within the image in a direction into the defined area;

for the period, accumulating a second count of those of the moving objects that cross the boundary of the defined area in a direction out of the defined area; and, computing an accuracy measure based at least in part on the first and second counts wherein computing the accuracy measure comprises computing a quotient of the first and second counts.

5. A method according to claim 1 wherein the boundary comprises a plurality of segments and accumulating the first count comprises separately accumulating a count of a number of the moving objects that cross the boundary of the defined area in the direction into the defined area for each of the plurality of segments.

6. A method according to claim 5 wherein accumulating the second count comprises separately accumulating a count of a number of the moving objects that cross the boundary of the defined area in the direction out of the defined area for each of the plurality of segments.

7. A method according to claim 5 wherein the defined area comprises a polygon having at least three sides and each of the segments is one side of the polygon.

8. A method according to claim 5 wherein the area is disposed in a location such that all of the moving objects which cross any one of the segments in the direction into the area must originate from the same one of the two or more spaces.

9. A method according to claim 5 wherein there are two or more of the segments such that all of the moving objects which cross the two or more of the segments in the direction out of the area cross into a same one of the two or more spaces.

10. A method according to claim 5 wherein at least one of the segments is curved.

11. A method according to claim 1 wherein processing the image data comprises determining that none of the moving objects are in the area at either a start or an end of the period.

12. A method according to claim 1 wherein processing the image data comprises determining a number of the moving objects within the area at a start of the period and determining a number of the moving objects within the area at an end of the period.

13. A method according to claim 1 wherein processing the image data comprises counting a number of the moving objects that are in the defined area at an end of the period and wherein computing the accuracy measure is based in part on the number of the moving objects that are in the defined area at an end of the period.

14. A method according to claim 1 wherein the moving objects are people.

15. A method according to claim 1 comprising obtaining the digitized images from a camera oriented to look downward onto the area from above.

16. A method according to claim 1 comprising repeating computing the accuracy measure for a plurality of different periods and outputting a graphical indication of the accuracy measure as a function of time.

17. A method according to claim 16 wherein the graphical indication of the accuracy measure comprises a bar chart.

18. A method according to claim 1 comprising maintaining an image buffer comprising one or more most recent digitized images and preserving contents of the image buffer in response to the accuracy measure indicating the occurrence of a counting error.

19. A tangible computer readable medium encoded with a computer program comprising computer readable instructions which, when executed by a data processor, cause the data processor to perform a method according to claim 1.

20. Apparatus for counting people or other moving objects, the apparatus comprising:

a data processor connected to receive digitized images of a region lying between two or more spaces, the data processor executing software instructions that cause the data processor to detect moving objects in the images;

a data store accessible to the data processor, the data store storing:

an area definition, the area definition defining a boundary of a defined area within the images, the boundary comprising a plurality of segments; and, for each of the plurality of the segments an inbound moving object counter and an outbound moving object counter;

wherein the data processor is configured to:

each time a moving object crosses into the defined area across one of the segments, increment the corresponding one of the inbound moving object counters;

each time a moving object crosses out of the defined area across one of the segments, increment the corresponding one of the outbound moving object counters; and, compute an accuracy measure based at least in part on a sum of the counts in the inbound moving object counters and a sum of the counts in the outbound moving object counters the accuracy measure indicative of a rate of counting errors.

21. Apparatus according to claim 20 wherein the data processor is configured to compute a difference between the sum of the counts in the inbound moving object counters and the sum of the counts in the outbound moving object counters and to compute the accuracy measure based at least in part on the difference.

22. Apparatus for counting people or other moving objects, the apparatus comprising:

a data processor connected to receive digitized images of a region lying between two or more spaces, the data processor executing software instructions that cause the data processor to detect moving objects in the images;

a data store accessible to the data processor, the data store storing:

an area definition, the area definition defining a boundary of a defined area within the images, the boundary comprising a plurality of segments; and, for each of the plurality of the segments an inbound moving object counter and an outbound moving object counter;

wherein the data processor is configured to:

each time a moving object crosses into the defined area across one of the segments, increment the corresponding one of the inbound moving object counters;

each time a moving object crosses out of the defined area across one of the segments, increment the corresponding one of the outbound moving object counters; and, compute an accuracy measure based at least in part on a sum of the counts in the inbound moving object counters and a sum of the counts in the outbound moving object counters; wherein the data processor is configured to compute a quotient of the sum of the counts in the inbound moving object counters and the sum of the counts in the outbound moving object counters and to compute the accuracy measure based at least in part on the quotient.

23. Apparatus according to claim 20 wherein the defined area comprises a polygon.

24. Apparatus according to claim 23 wherein the segments comprise straight lines.

25. Apparatus according to claim 20 wherein the defined area is a triangle.

26. A method according to claim 1 comprising computing the accuracy measure in response to a determination that there are no persons in the area.

* * * * *